United States Patent
Lee et al.

(10) Patent No.: US 7,085,498 B2
(45) Date of Patent: Aug. 1, 2006

(54) APPARATUS FOR REGENERATING ALL-OPTICAL SIGNAL AND METHOD THEREOF

(75) Inventors: Ki-Cheol Lee, Suwon-shi (KR); Yun-Je Oh, Yongin-shi (KR)

(73) Assignee: Samsung Electronics Co., Ltd., Suwon-si (KR)

(*) Notice: Subject to any disclaimer, the term of this patent is extended or adjusted under 35 U.S.C. 154(b) by 224 days.

(21) Appl. No.: 10/619,252

(22) Filed: Jul. 14, 2003

(65) Prior Publication Data

US 2004/0013353 A1 Jan. 22, 2004

(30) Foreign Application Priority Data

Jul. 20, 2002 (KR) ............................. 10-2002-0042736

(51) Int. Cl.
*H04B 10/00* (2006.01)
*G02B 6/26* (2006.01)

(52) U.S. Cl. ..................... 398/155; 398/159; 385/24

(58) Field of Classification Search ............... 385/24; 398/154–155, 159, 175
See application file for complete search history.

(56) References Cited

U.S. PATENT DOCUMENTS

| | | | |
|---|---|---|---|
| 6,282,007 B1 | 8/2001 | Roberts | 359/181 |
| 6,396,607 B1 * | 5/2002 | Cao | 398/154 |
| 2003/0169473 A1 * | 9/2003 | Cotter et al. | 359/245 |
| 2004/0208610 A1 * | 10/2004 | Grosz et al. | 398/148 |

FOREIGN PATENT DOCUMENTS

| | | |
|---|---|---|
| EP | 08496622 A2 | 6/1998 |
| EP | 0901245 A1 | 3/1999 |
| WO | WO 02/29981 | 4/2002 |

OTHER PUBLICATIONS

Patent Application Publication No. US 2001/0050794; Publication Date: Dec. 13, 2001; "Device for Regenerating Optical Signals," Patrick Brindel et al; 15 pages.

* cited by examiner

*Primary Examiner*—Akm Enayet Ullah
*Assistant Examiner*—Jerry T Rahll
(74) *Attorney, Agent, or Firm*—Cha & Reiter, L.L.C.

(57) ABSTRACT

Disclosed are an apparatus for regenerating a distorted optical signal through reamplification, regenerating, and retiming processes in an optical communication network and a method thereof. The apparatus includes an optical clock generation section for generating an optical clock signal of a specified frequency, an optical signal sampling section for sampling a distorted non-return-to-zero (NRZ) optical signal in synchronization with the clock signal from the optical clock generation section, an optical signal regenerating section for regenerating an output signal of the sampling section, and a return-to-zero (RZ)/NRZ conversion section for converting the optical signal reshaped by the optical signal regenerating section into an NRZ optical signal. The apparatus overcomes the limitations of the signal processing speed produced in the electric 3R type regenerator, and enable the signal regenerating to be performed without the necessity of an optical clock extraction apparatus.

9 Claims, 9 Drawing Sheets

APPARATUS FOR REGENERATING ALL-OPTICAL SIGNAL AND METHOD THEREOF

CLAIM OF PRIORITY

This application claims priority to an application entitled "Apparatus For Regenerating All-Optical Signal and Method Thereof," filed in the Korean Intellectual Property Office on Jul. 20, 2002 and assigned Serial No. 2002-42736, the contents of which are hereby incorporated by reference.

BACKGROUND OF THE INVENTION

1. Field of the Invention

The present invention relates to an apparatus for regenerating an all-optical signal and method thereof that regenerates a distorted optical signal through regenerating, reamplification, and retiming processes in an optical communication network.

2. Description of the Related Art

Recently, as data traffic increases progressively on the Internet, there has been a demand for a large-capacity wavelength division multiplexing (WDM) optical communication network. It is likely that the response to this need will be a large-capacity optical communication network comprising a long-distance WDM optical transmission network that accommodates high-speed data of 10 to 40 Gb/s per channel, optical cross-connect (OXC), optical add/drop multiplexer (OADM), optical router, etc. In such an optical communication network, a high-speed optical signal of over 10 Gb/s is severely distorted by chromatic dispersion and a non-linear phenomenon produced in an optical fiber, an amplified spontaneous emission (ASE) noise produced from an erbium-doped fiber amplifier (EDFA), and crosstalk, noise, and a non-linear phenomenon produced in an optical node such as the OXC, OADM, and optical router. This distortion causes the production of optical signal amplitude fluctuation, timing jitters, etc.

In order to alleviate the above-described problems, a 3R signal regenerator, which can improve the signal performance by regenerating, reamplifying and retiming the distorted optical signal, is required.

Conventionally, an optical/electronic/optical (O/E/O) 3R signal regenerator, which converts an optical signal into an electric signal, electrically performs the 3R, and then converts the electric signal into an optical signal, has been used. However, this electric 3R type regenerator cannot maintain the transparency that is an inherent characteristic of the optical signal, and has the limitations in processing the basic 3R if the data rate of the wavelength channel becomes high, e.g., about 40 Gb/s.

In order to solve this problem, an all-optical 3R signal regenerator for regenerating a distorted optical signal in an all-optical region has been developed, and apparatuses for regenerating a high-speed return-to-zero (RZ) optical signal of several tens of Gb/s have been published.

However, though the conventional all-optical 3R signal shaper can reshape only the RZ optical signal and thus it can be efficiently used in the OTDM system, it is not suitable for the WDM optical communication network where the non-return-to-zero (NRZ) optical signal is mainly used. Also, in order to perform the retiming operation among the 3R signal regenerating processes, optical clock extraction is required. However this optical clock extraction is a very complicated technique, still presently at an elementary level.

SUMMARY OF THE INVENTION

The present invention is provides an apparatus for regenerating an all-optical signal and a method thereof that reshape a distorted optical signal through reamplification, regenerating and retiming processes in a WDM optical communication network. Also, the present invention provides an apparatus for regenerating an all-optical signal and a method thereof that overcome the limitations of the signal processing speed produced in the electric 3R type regenerator, and enable the signal regenerating to be performed irrespective of the speed or format of data.

Further, the present invention to provides an apparatus for regenerating an all-optical signal and a method thereof that can perform an all-optical regenerating of a non-return-to-zero (NRZ) optical signal having a speed of 40 Gb/s without extracting an optical clock signal.

The present invention an apparatus for regenerating an all-optical signal, comprising an optical clock generation section for generating an optical clock signal of a specified frequency, an optical signal sampling section for sampling a distorted non-return-to-zero (NRZ) optical signal in synchronization with the clock signal from the optical clock generation section, an optical signal regenerating section for regenerating an output signal of the sampling section, and a return-to-zero (RZ)/NRZ conversion section for converting the optical signal reshaped by the optical signal regenerating section into an NRZ optical signal.

In accordance with another aspect of the present invention, there is provided a method of regenerating a distorted all-optical signal in a WDM optical communication network, the method comprising the steps of generating an optical clock signal, sampling the distorted optical signal in synchronization with the optical clock signal, regenerating the sampled optical signal in synchronization with the optical clock signal, and converting the reshaped optical signal into a non-return-to-zero optical signal.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE PREFERRED EMBODIMENT

Hereinafter, an apparatus for regenerating an all-optical signal and a method thereof according to preferred embodiments of the present invention is described with reference to the accompanying drawings. In the following description of the present invention, a detailed description of known functions and configurations incorporated herein will be omitted when it may make the subject matter of the present invention rather unclear.

Figure 1:
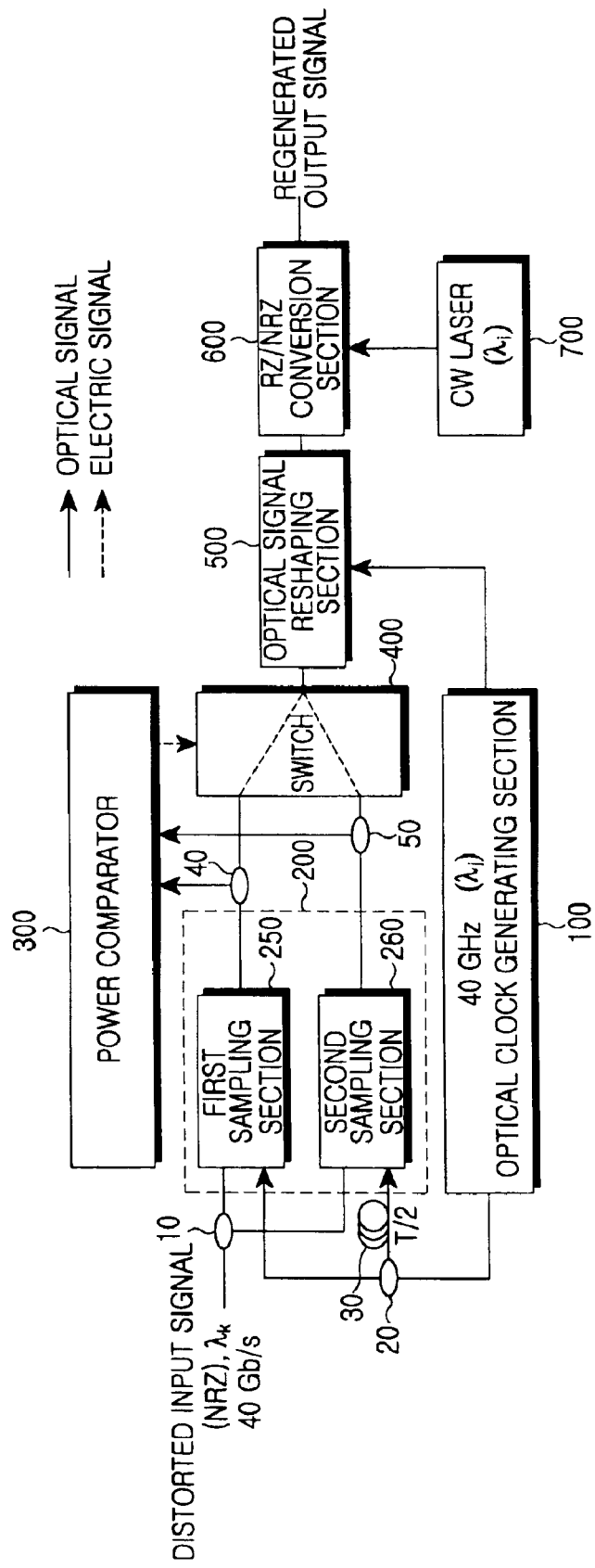
FIG. 1 is a block diagram illustrating the construction of an optical signal generating apparatus according to the present invention.

Referring to FIG. 1, the all-optical 3R signal regenerating apparatus according to the present invention includes a 40-GHz optical clock generation section 100, optical signal sampling section 200, power comparator 300, optical switch 400, optical signal reshaping section 500, all-optical return-to-zero (RZ)/non-return-to-zero (NRZ) conversion section 600, and a continuous wave (CW) laser 700.

The 40-GHz optical clock generation section 100 generates an ultra-short optical pulse string with a frequency of 40 GHz.

The optical signal sampling section 200 is composed of first and second optical signal sampling sections 250 and 260, and performs a sampling of the distorted NRZ optical signal inputted to the all-optical 3R signal regenerating apparatus using the optical clock signal of 40 GHz.

The power comparator 300 compares the power of an input signal to the all-optical 3R signal regenerating apparatus with the power of an output signal of the sampling section, and transmits a control signal to the optical switch 400 so that an accurately sampled output signal can be selected. The optical switch 400 selects and transmits to the optical signal regenerating section the accurately sampled output signal.

The optical signal reshaping section 500 performs a signal regenerating function, and the RZ/NRZ conversion section 600 performs a function of converting the reshaped optical signal into a NRZ optical signal.

The operation of the all-optical signal regenerating apparatus as constructed above according to the present invention is now explained.

Figure 2:
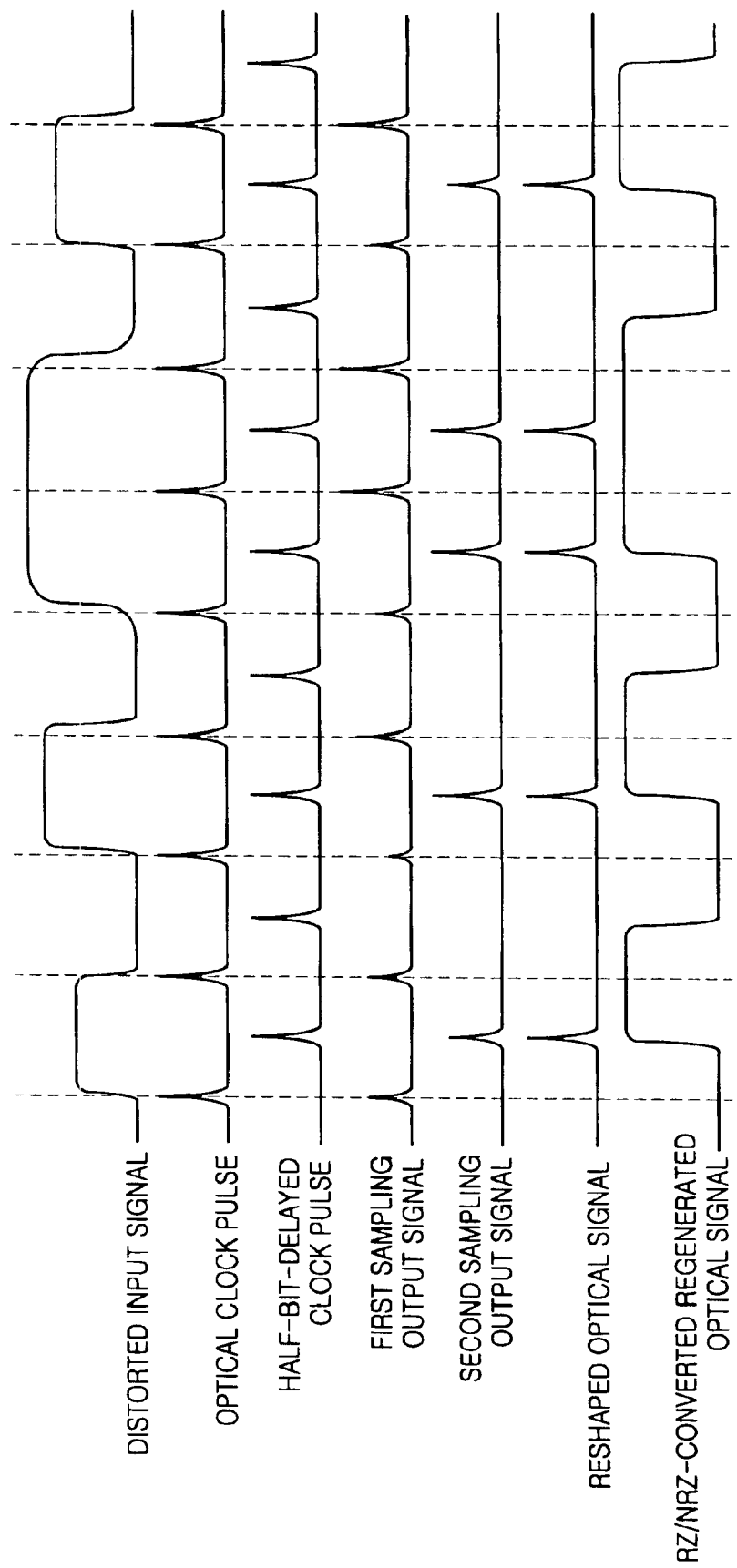
FIG. 2 illustrates a timing diagram of the apparatus of FIG. 1.

Referring to FIGS. 1 and 2, the distorted NRZ optical signal is inputted to the all-optical 3R signal regenerator with amplitude fluctuation and timing jitter. The inputted optical signal is divided by a 50:50 optical coupler 10, and divided optical signals are inputted to the first and second optical sampling sections 250 and 260, respectively. The optical clock generated from the 40-GHz optical clock generation section 100 is divided by a 50:50 optical coupler 20, and one of divided optical clocks is inputted to the first optical sampling section 250 without delay, while the other of divided optical clocks is inputted to the second optical sampling section 260 through a half-bit (i.e., T/2) optical delay 30.

The first and second optical sampling sections 250 and 260 perform the sampling of the distorted NRZ optical signals using the optical clock, respectively, to output sampled optical signals. The sampled optical signals are divided by optical couplers 40 and 50, respectively, and then transmitted to the power comparator 300. The power comparator transmits the control signal to the optical switch 400 so that this accurately sampled output can be selected. As illustrated in FIG. 2, since the output of the second sampling section is accurately sampled, the optical switch selects the output of the second sampling section, and transmits it to the optical signal reshaping section 500. Through the above-described process, the distorted NRZ optical signal is synchronized with the optical clock of 40 GHz to perform the switching function.

The signal selected by the optical switch 400 is the one obtained by sampling the distorted optical signal, and still has the characteristics of amplitude fluctuation. The optical signal reshaping section 500 makes the sampled signals have the same amplitude using the optical clock of 40 GHz, and performs the regenerating of the optical signal. The reshaped RZ optical signal is converted into the NRZ optical signal by the all-optical RZ/NRZ conversion section 600 using the CW laser signal 700, and at this time, its reamplification is also performed. Through the above-described process, the all-optical 3R signal regenerating of the distorted NRZ optical signal is performed.

Figure 3:
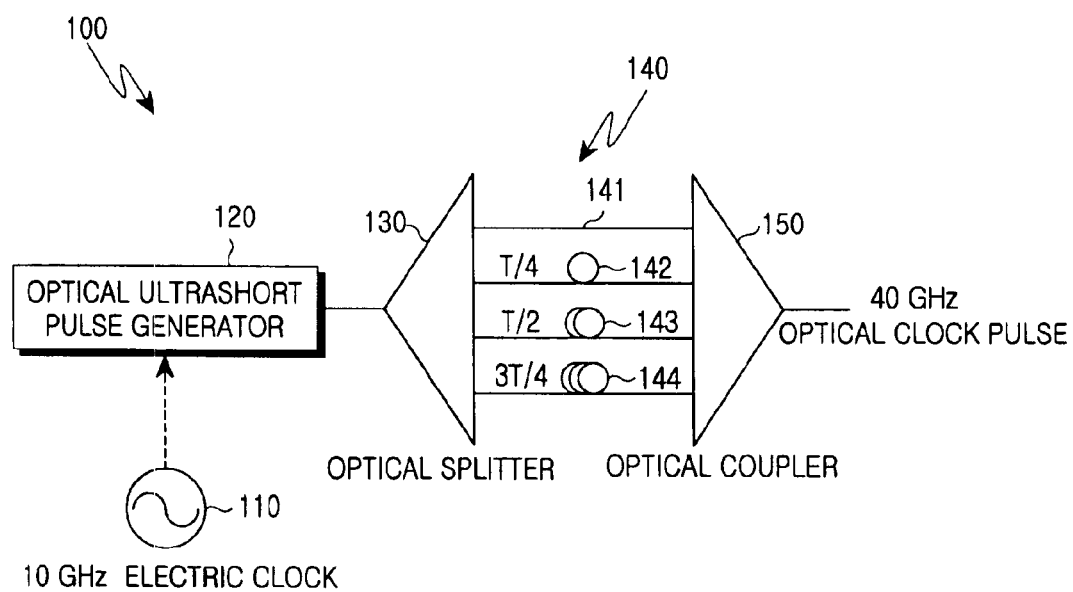
FIG. 3 is a view illustrating the construction of an optical clock generation section according to an embodiment of the present invention.
Figure 4:
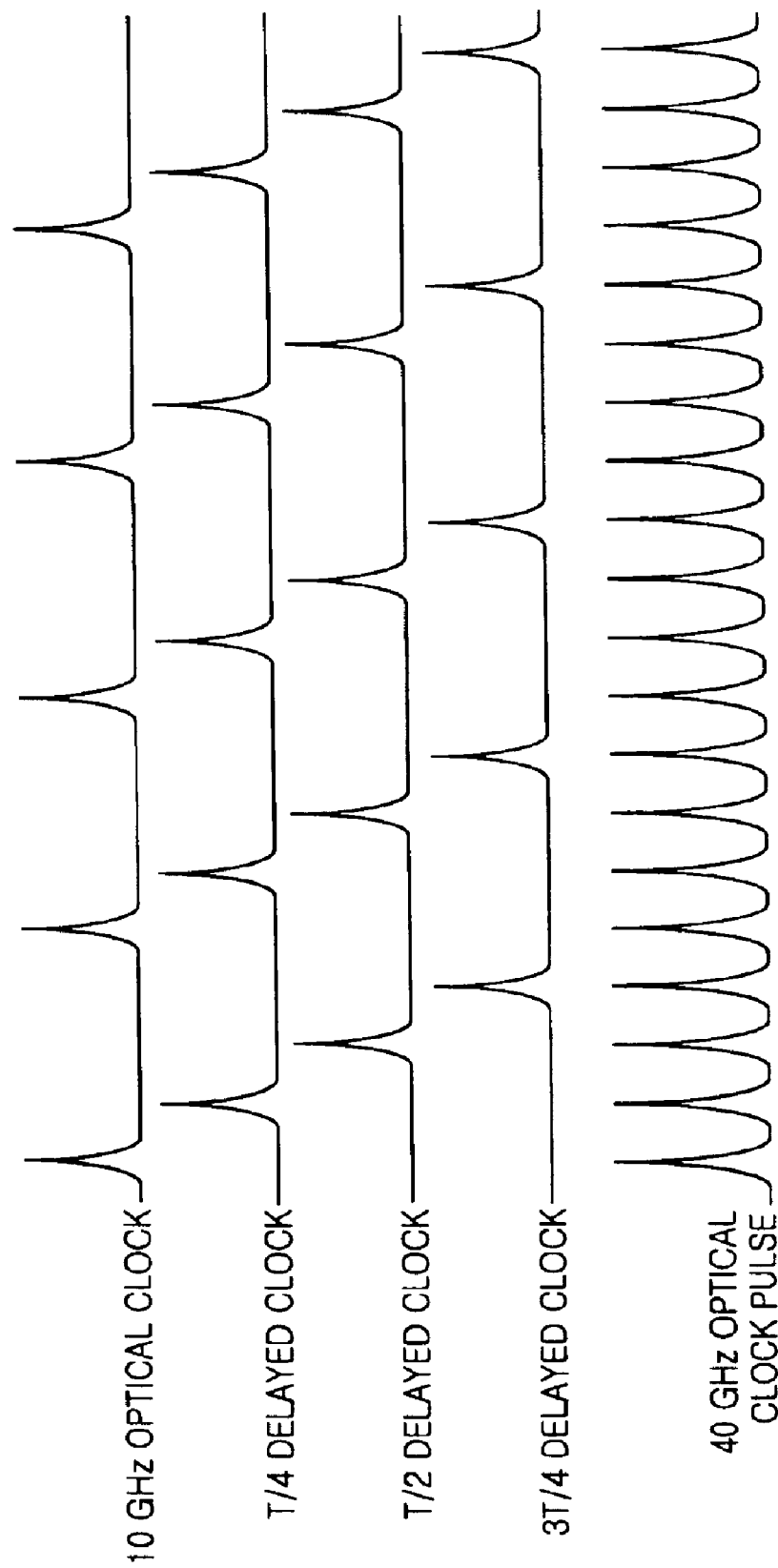
FIG. 4 illustrates a timing diagram of the section of FIG. 3.

FIG. 3 is a view illustrating the construction of an optical clock generation section 100 according to an embodiment of the present invention, and FIG. 4 is a timing diagram of the section of FIG. 3.

The 40-GHz optical clock generation section 100 includes a 10-GHz electric clock generator 110, an optical ultra-short pulse generator 120, an optical splitter 130, an optical delay line 140, and an optical coupler 150. The 40-GHz optical clock generation section 100 has the following operational characteristics.

Referring to FIGS. 3 and 4, the 10-GHz electric clock generator 110 generates an electric clock in the form of a sine wave, and the optical ultra-short pulse generator 120 generates an ultra-short optical clock pulse of 10 GHz using the 10-GHz electric clock. The 10-GHz optical clock pulse is divided into four optical signals by the 1×4 optical splitter 130, and the four divided optical signals are coupled by the 4×1 optical coupler 150 after passing through optical delays 141 to 144 of 0, T/4, T/2, and 3T/4, respectively, so that a 40-GHz optical clock $3e$ is generated from the 4×1 optical coupler 150 and transmitted to the optical sampling section and the optical signal regenerating section.

Figure 5:
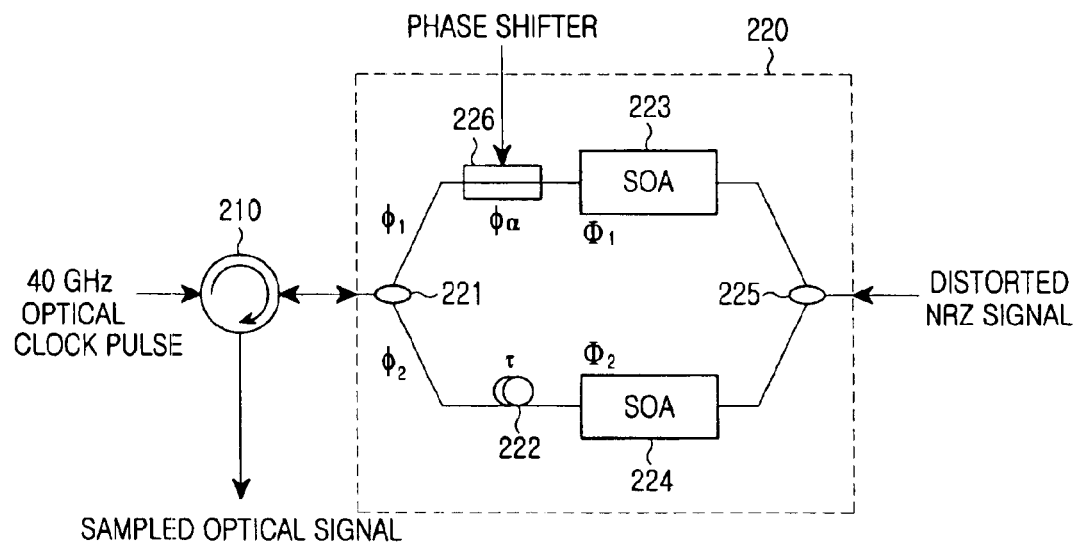
FIG. 5 is a view illustrating the construction of an optical sampling section according to an embodiment of the present invention.

FIG. 5 is a view illustrating the construction of an optical sampling section according to an embodiment of the present invention, and FIGS. 6A to 6D are timing diagrams of the section of FIG. 5.

Referring to FIGS. 1 and 5, the optical signal sampling section 200 is composed of the first and second optical signal sampling sections 250 and 260, and each of the first and second optical signal sampling sections 250 and 260 includes a Mach-Zehnder interferometer (MZI) 220 composed of two optical couplers 221 and 225, an optical delay line 222, two semiconductor optical amplifiers (SOA) 223 and 224, a phase shifter 226, and an optical circulator 210.

The optical signal sampling section performs the following operation.

Referring to FIGS. 5, 6A to 6D, the 40-GHz optical clock (FIG. 6A) from the optical sampling section 200 is inputted to the Mach-Zehnder interferometer (MZI) 220 through the optical circulator 210. The input optical clock is divided into upper and lower optical clocks. The upper optical clock is inputted to the semiconductor optical amplifier 223 without delay, while the lower optical clock is inputted to the semiconductor optical amplifier 224 through the optical delay line 22 of t (t<<T/2). Also, the distorted NRZ optical signal is divided into two optical signals by the right-side 50:50 optical coupler 225, and inputted to the semiconductor optical amplifiers 223 and 224, respectively. The optical clock pulses change gain dynamics of the semiconductor optical amplifiers to cause phase changes of the inputted NRZ optical signals.

Figure 6A:
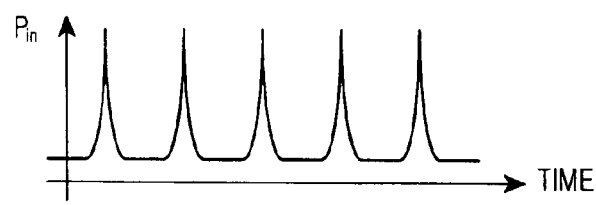
FIGS. 6A to 6D illustrate timing diagrams of the section of FIG. 5.
Figure 6B:
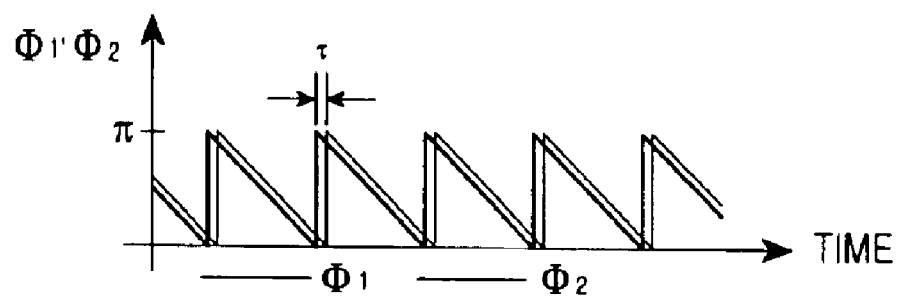
Figure 6C:
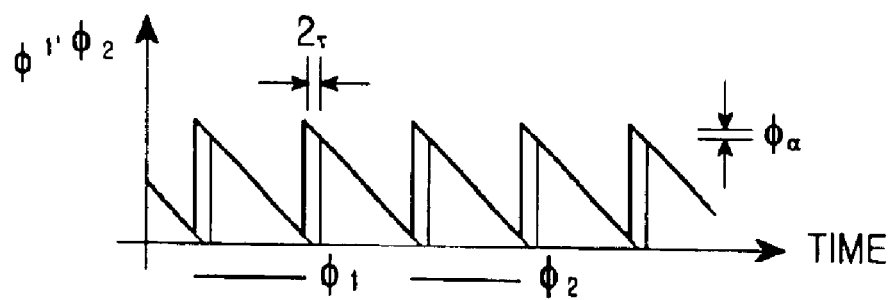
Figure 6D:
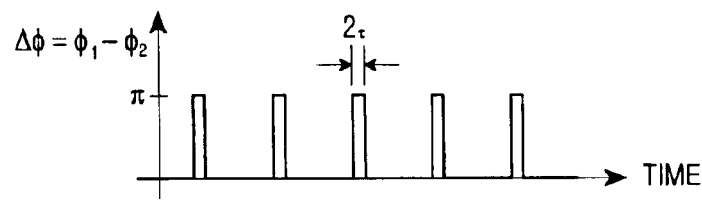

At this time, the changed phases of the upper optical signal $\Phi_1$ and the lower optical signal $\Phi_2$ have a time difference as much as $\tau$. The NRZ optical signal outputted from the upper semiconductor optical amplifier 223 obtains an additional phase change of $\phi_a$ through the phase shifter 226, and the NRZ optical signal outputted from the upper semiconductor optical amplifier 224 obtains an optical delay of τ. Then, the NRZ optical signals are coupled by the optical coupler 221 with the phases of $φ_1$ and $φ_2$, respectively, as shown in FIG. 6C. At this time, the phases of $φ_1$ and $φ_2$ have a time difference of as much as 2τ. The optical signals coupled by the optical coupler 221 have a phase difference of $φ_1-φ_2$ as shown in FIG. 6D, and thus a signal having a phase change of π for a time period of 2τ is outputted from the optical coupler 221. Also, in the Mach-Zehnder interferometer (MZI) 220, the upper optical signal and the lower optical signal have a basic phase difference of π. Accordingly, the portions appearing to have the phase differences of 0 and π in FIG. 6D will actually have the phase differences of π and 2π, respectively. At this time, since the phase difference of π means an offset interference, and the phase difference of 2π means a reinforcement interference, the NRZ optical signal is sampled only as much as 2τ, and the sampled NRZ optical signal is outputted through the optical circulator 210.

Referring again to FIG. 1, the power comparator 300 compares the power of the input signal of the all-optical 3R signal regenerating apparatus with the power of the output signals of the first and second sampling sections, and transmits the control signal to the optical switch 400 so that the accurately sampled output signal can be selected. The optical switch 400 selects the accurately sampled output signal, and transmits the selected signal to the optical signal reshaping section 500.

The optical signal reshaping section 500 includes a Mach-Zehnder interferometer (MZI) composed of two semiconductor optical amplifiers, a π-phase shifter, and a half-bit optical delay line, and an optical circulator, and regenerates the signal selected by the optical switch. The construction and operation of the optical signal reshaping section 500 are the same as those of the all-optical RZ/NRZ conversion section 600, in which the CW laser is replaced by the 40-GHz optical clock generator, to be explained later.

Figure 7:
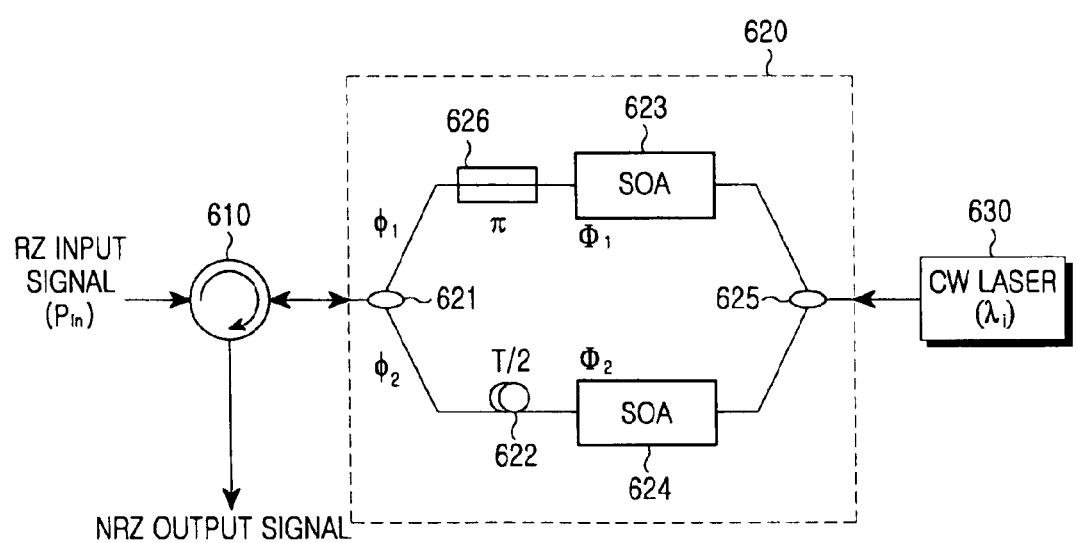
FIG. 7 is a view illustrating the construction of a return-to-zero/non-return-to-zero conversion section according to an embodiment of the present invention.

FIG. 7 is a view illustrating the construction of an RZ/NRZ conversion section 600 according to an embodiment of the present invention, and FIGS. 8A to 8D are timing diagrams of the section of FIG. 7.

As shown in FIG. 7, the all-optical RZ/NRZ conversion section 600 includes a Mach-Zehnder interferometer (MZI) 620 composed of two optical couplers 621 and 625, an optical delay line 622, two semiconductor optical amplifiers (SOA) 623 and 624, and a phase shifter 626, an optical circulator 610, and a CW laser 630, and converts the RZ optical signal reshaped in the optical regenerating section into a NRZ signal form.

Figure 8A:
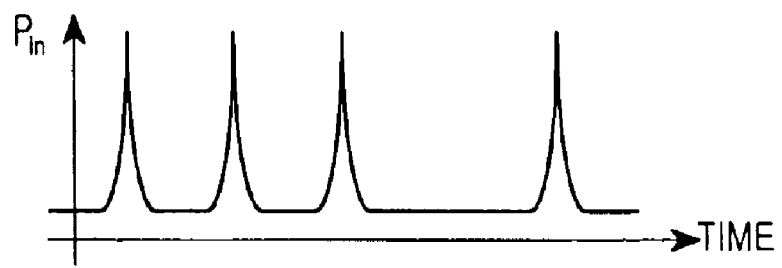
FIGS. 8A to 8D illustrate timing diagrams of the section of FIG. 7.
Figure 8B:
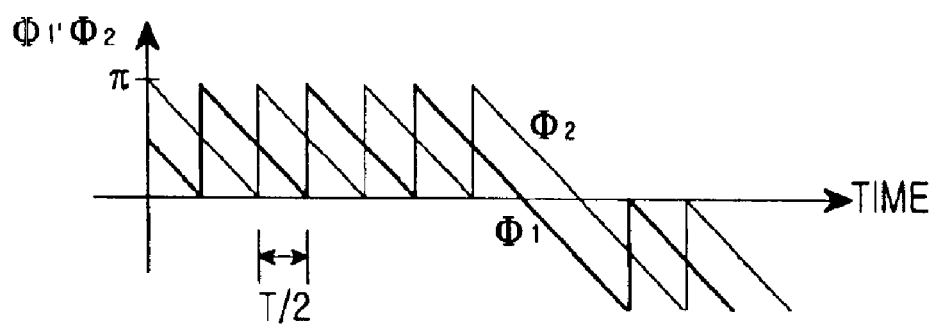

Referring to FIGS. 7, 8A to 8D, the RZ optical signal (FIG. 8A) reshaped in the optical signal regenerating section is inputted to the Mach-Zehnder interferometer (MZI) 620 through the optical circulator 610. The input RZ optical signal is divided into upper and lower optical signals, and the upper lower optical signals are inputted to the semiconductor optical amplifiers 623 and 624 through optical delays of 0 and T/2, respectively. Also, the optical signal generated from the CW laser 630 is divided into two optical signals, and inputted to the semiconductor optical amplifiers 623 and 624, respectively. The input left-side RZ optical signals change the gain dynamics of the semiconductor optical amplifiers 623 and 624 in order to cause the phase change of the input left-side CW optical signal as shown in FIG. 8B.

Figure 8C:
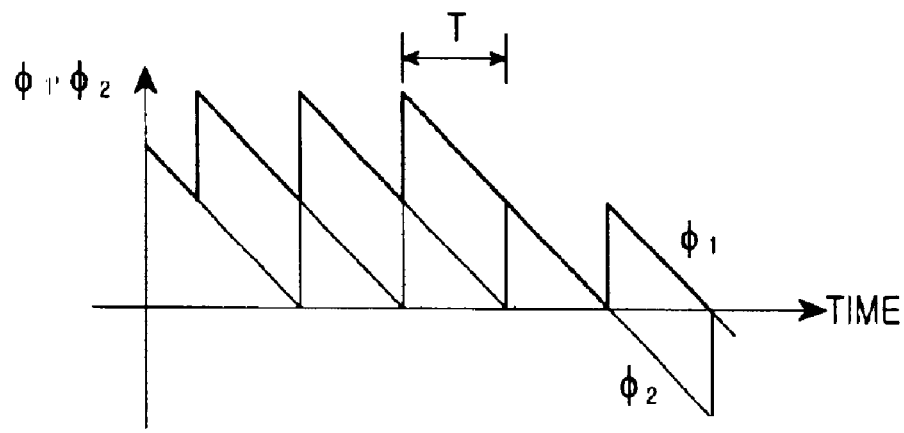
Figure 8D:
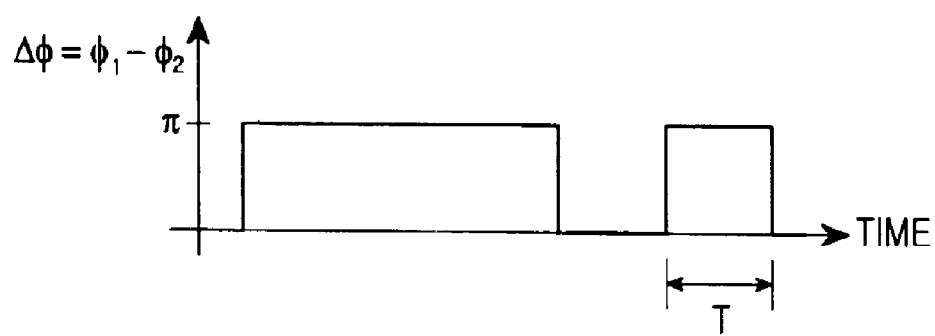

At this time, the changed phases of the upper optical signal $Φ_1$ and the lower optical signal $Φ_2$ have the time difference as much as T/2. The optical signal outputted from the upper semiconductor optical amplifier 623 obtains a phase change of π through the phase shifter 626, and the optical signal outputted from the upper semiconductor optical amplifier 624 obtains an optical delay of T/2. Then, the optical signals are coupled by the optical coupler 621 with the phases of $φ_1$ and $φ_2$, respectively, as shown in FIG. 8C. At this time, the phases of $φ_1$ and $φ_2$ have the time difference as much as T, i.e., the one-bit time difference. The optical signals coupled by the optical coupler 621 have the phase difference of $φ_1-φ_2$ as shown in FIG. 8D. Thus, in consideration of the basic phase difference of π generated from the Mach-Zehnder interferometer (MZI) 620, the portions appearing to have the phase differences of 0 and π in FIG. 8D will actually have the phase differences of π and 2π, respectively. The portion having the phase difference of 0 among the CW optical signals outputted from the optical coupler 621 vanish through an offset interference, and the portion having the phase difference of π is reinforced by a reinforcement interference to be outputted through the optical circulator 610. Through the above-described process, the RZ optical signal is converted into the NRZ optical signal.

As described above, the all-optical 3R signal regenerating apparatus according to the present invention can overcome the limitations of the signal processing speed produced in the electric 3R signal regenerating apparatus, and enable the signal regenerating to be performed irrespective of the speed or format of data, thereby maintaining the transparency.

Also, since the all-optical signal regenerating apparatus according to the present invention does not require the optical clock extraction apparatus, its construction is simplified, and it can perform the all-optical regenerating of the non-return-to-zero (NRZ) optical signal having a speed of 40 Gb/s.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for regenerating a distorted optical signal through reamplification, regenerating, and retiming processes in an optical communication network, the apparatus comprising:
   an optical clock generation section that generates an optical clock signal of a specified frequency;
   an optical signal sampling section that samples a distorted non-return-to-zero (NRZ) optical signal in synchronization with the clock signal from the optical clock generation section;
   an optical signal regenerating section that regenerates an output signal of the sampling section in synchronization with the clock signal from the optical clock generation section; and
   a return-to-zero (RZ)/NRZ conversion section that converts the optical signal reshaped by the optical signal regenerating section into an NRZ optical signal.

2. The apparatus as claimed in claim 1, wherein the optical clock generation section comprises:
   an electric clock generator that generates an electric clock signal in the form of a sine wave;
   an optical ultra-short pulse generator that generates an optical ultra-short clock pulse in synchronization with the clock signal generated by the electric clock generator;

an optical splitter that splits the optical clock pulse generated by the optical ultra-short pulse generator into a predetermined number of optical pulse signals; and an optical coupler that couples the predetermined number of optical pulse signals split by the optical splitter after delaying the predetermined number of optical pulse signals for a predetermined time through an optical delay line.

3. The apparatus as claimed in claim 1, wherein:

the predetermined number of optical pulse signals is at least two; and the optical signal sampling section comprises first and second optical signal sampling sections, wherein, one of the optical clock signals generated by the optical clock generation section and split by the optical coupler is inputted to the first optical signal sampling section without delay, and another of the optical clock signals is inputted to the second optical signal sampling section through a half-bit optical delay.

4. The apparatus as claimed in claim 3, further comprising:

a power comparator that compares a power of an input signal of the all-optical signal regenerating apparatus with powers of output signals of the first and second sampling sections; and an optical switch that receives a control signal from the power comparator, and selects an accurately sampled output signal.

5. The apparatus as claimed in claim 3, wherein each of the first and second optical signal sampling section comprises a Mach-Zehnder interferometer (MZI) and an optical circulator.

6. The apparatus as claimed in claim 1, wherein the RZ/NRZ conversion section comprises:

an optical circulator that receives the RZ optical signal, and outputs the NRZ optical signal;

a continuous wave (CW) laser; and a Mach-Zehnder interferometer (MZI) that receives the optical signals from the optical circulator and the CW laser, and outputs the NRZ optical signal to the optical circulator.

7. The apparatus as claimed in claim 6, wherein the MZI comprises:

a first optical coupler that receives, divides, and couples the optical clock signal;

a second optical coupler that receives, divides, and couples the distorted NRZ optical signal;

a delay that delays for a predetermined time the optical clock signal split by the first coupler;

a first semiconductor optical amplifier that receives one of the optical clock signals delayed by the delay and one optical signal divided by the second optical coupler;

a second semiconductor optical amplifier that receives the other of the optical clock signals delayed by the delay and the other optical signal divided by the second optical coupler; and a phase shifter that shifts a phase of an output signal of the second semiconductor amplifier, and inputs the phase-changed signal to the first optical coupler.

8. A method of regenerating a distorted optical signal through reamplification, regenerating, and retiming processes in an optical communication network, the method comprising the steps of:

generating an optical clock signal;

sampling the distorted optical signal in synchronization with the optical clock signal;

regenerating the sampled optical signal in synchronization with the optical clock signal; and converting the reshaped optical signal into a non-return-to-zero optical signal.

9. The method as claimed in claim 8, wherein the step of sampling the distorted optical signal further comprises the steps of:

dividing the optical clock pulse signal into a non-delayed optical clock signal and a half-bit-delayed optical clock signal;

sampling the distorted optical signal by two optical sampling sections in synchronization with the respective divided optical clock signals; and selecting an accurately sampled optical signal by comparing powers of the sampled optical signals.

* * * * *